July 16, 1929.  F. R. SIMPSON  1,720,696
PACKING GLAND
Filed July 15, 1925
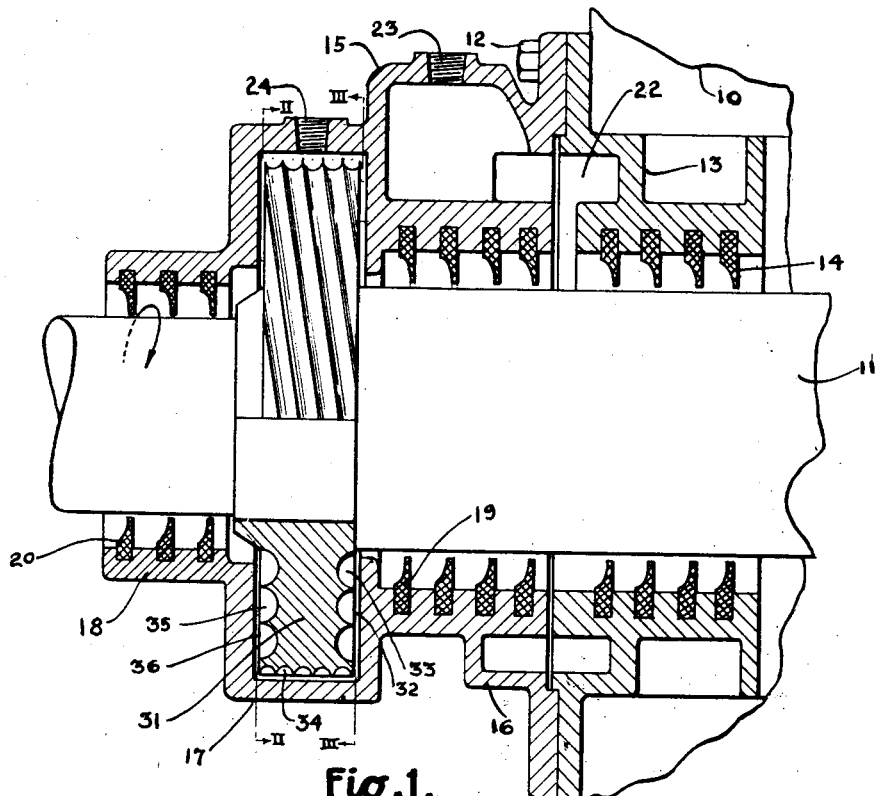
Fig.1.
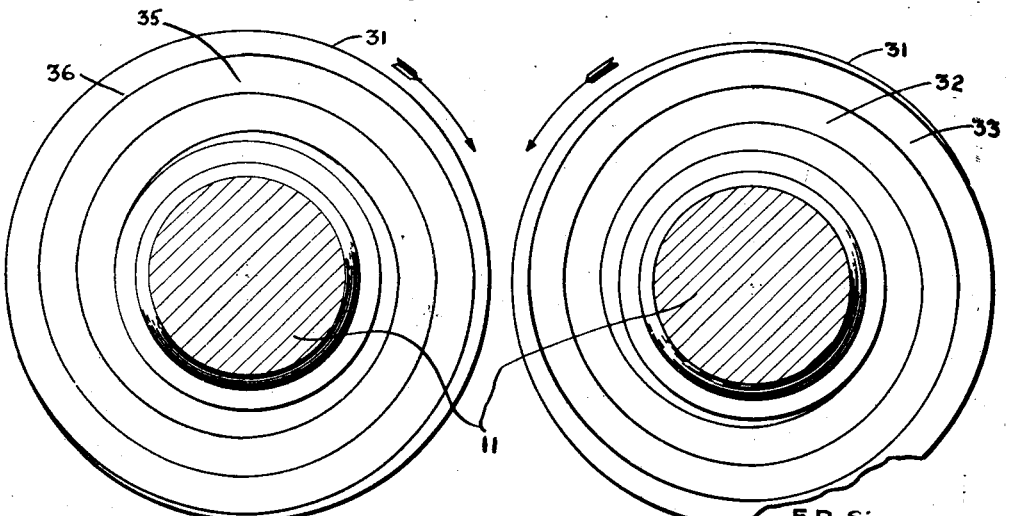
WITNESSES:  Fig.2.  Fig.3.  F.R. Simpson INVENTOR
BY D.C. Davis
ATTORNEY Patented July 16, 1929.

1,720,696

UNITED STATES PATENT OFFICE.

FRANK R. SIMPSON, OF UPPER DARBY TOWNSHIP, DELAWARE COUNTY, PENNSYLVANIA, ASSIGNOR TO WESTINGHOUSE ELECTRIC & MANUFACTURING COMPANY, A CORPORATION OF PENNSYLVANIA.

PACKING GLAND.

Application filed July 15, 1925. Serial No. 43,875.

My invention relates to packing glands, such as rotatable shaft packing glands and particularly to liquid glands for sealing the shafts of fluid motors such, for example, as steam turbines, and it has for an object to provide apparatus of the character designated which shall operate efficiently and effectively and which shall be capable of sealing against substantial pressure differences. It has for a further object to provide a packing gland which shall absorb a minimum amount of motive power in its operation as well as entail the loss of a minimum amount of the sealing fluid.

These and other objects, which will be made apparent throughout the further description of my invention, may be attained by the employment of the apparatus hereinafter described and illustrated in the accompanying drawing in which Fig. 1 is a longitudinal view, partly in section and partly in elevation, of one form of gland constructed in accordance with my invention; and Figs. 2 and 3 are views, in sectional elevation, taken on the lines II—II and III—III of Fig. 1 respectively.

Centrifugal liquid sealing devices or packings are generally recognized as providing a very effective means for preventing the leakage of fluid between the rotor and the casing of steam turbines. Apparatus of this character generally includes a runner which is attached to the turbine rotor and adapted to operate in a closed annular chamber communicating with the turbine casing. In operation, the centrifugal action of the rotating runner maintains a relatively small quantity of water, which is present in the annular chamber, against the outer walls at a pressure sufficient to prevent leakage of air into the turbine, as under high vacuum conditions, or steam from leaking out of the turbine, as under atmospheric or back pressure exhaust conditions.

It is customary to provide in glands of this character impelling vanes upon the transverse faces of the runner. However, in operation, the impelling vanes associated with one face of the runner tend to impel the sealing liquid in a direction to oppose fluid leakage, that is, from the low pressure side to the high pressure side of the runner, while the impelling vanes associated with the remaining face of the runner tend to impel the sealing liquid in the direction of leakage, that is, from the high pressure to the low pressure side of the runner. I have therefore conceived the idea of dispensing with the impelling vanes and providing in lieu thereof a continuous spiral or convoluted incision or passage so arranged, with respect to the direction of rotation, that the sealing liquid is impelled in a counter-direction to fluid leakage on both sides of the runner. By employing such construction, not only may both transverse or lateral faces of the runner be utilized to impel the sealing liquid against the leakage pressure, but the peripheral surface of the runner may be also utilized. By so constructing a gland wherein both transverse faces as well as the outer peripheral surface of the runner may be utilized to impel the sealing liquid, the physical proportions of the glands for various capacities may be very materially reduced.

Referring to the drawing for a more detailed description of my invention, I show in Fig. 1 a portion of a turbine casing 10 provided with a rotor 11. Inserted within the casing 10 and suitably secured thereto, as by bolts 12, is a packing cylinder 13 having a series of labyrinth packing elements 14 of any well-known type. Disposed adjacent to the packing cylinder 13 and also secured to the turbine casing 10 by the bolts 12 is a casting 15 comprising an inner packing cylinder 16, a housing 17 and an outer packing cylinder 18. The inner and outer packing cylinders 16 and 18 are provided respectively with a series of labyrinth packing elements 19 and 20, of any well-known type. The packing cylinder 13 and the inner packing cylinder 16 cooperate to provide an annular passage 22 having a vapor outlet connection 23. Provided in the housing 17 is an inlet connection 24 for the admission of sealing liquid to the housing 17.

Disposed in the housing 17 and rigidly secured to the rotor 11, in any suitable manner, is a runner 31. Assuming a direction of rotation as indicated by the arrow and that the pressure prevailing within the turbine casing is less than atmospheric, the runner 31 has provided on its transverse face 32, arranged adjacent to the turbine, a spiral or convoluted groove, incision, passage, furrow, or channel 33. As shown in Fig. 3, the groove 33 is so arranged that the direction of rotation induces a movement of the sealing liquid outwardly from the axis of the runner. Similar grooves 34 may be also provided in the peripheral surface of the runner 31, the latter being preferably arranged in the form of a helix so as to lead the liquid axially in a direction to oppose leakage of fluid into the turbine. As shown in Fig. 2, a groove 35 is also provided in the transverse face 36 of the runner which is remotely disposed from the turbine. This groove is arranged to impel the liquid inwardly toward the turbine shaft.

The operation of the above embodiment of my invention is as follows: Assuming the turbine to be exhausting at a subatmospheric pressure, there is a natural tendency for the surrounding air to attempt to find its way into the turbine casing, thereby increasing the exhaust pressure and impairing the performance of the turbine. Sealing fluid, such as water, is therefore supplied through the liquid inlet connection 24 to the housing 17, the liquid being preferably supplied at a pressure slightly in excess of the pressure differences prevailing on the opposite sides of the runner 17 which, in this instance, has been cited, for example, at approximately 15 pounds per square inch.

Assuming the rotor 11 to be rotating in the direction indicated by the arrows, the spiral groove 33 provided in the transverse face 32 of the runner tends to arrest the flow of the sealing liquid toward the axis of the rotor and to impel it radially outward. The sealing liquid in contact with the peripheral surface of the runner is conveyed axially away from the turbine casing by the helical groove 34, while the liquid in contact with the transverse face 36 of the runner tends to move radially inward through the action of the spiral groove 35. As the air attempting to find its way into the turbine casing must travel in a path directly counter to the movement of the sealing liquid in contact with the three surfaces of the runner, it is apparent that leakage of air into the turbine is very effectively guarded against, the design of the grooves being such that the impelling action exerted thereby is substantially counteracted or equalized by the pressure of the air.

From the description of my novel form of gland runner, it will be apparent that I have utilized all of the available surface of the runner for opposing leakage. While I have described the construction of the runner in relation to a turbine exhausting at a subatmospheric pressure, it is obvious that the various grooves may be readily arranged for sealing against leakage of fluid from the turbine to the atmosphere. Furthermore the runner may be easily constructed to suit either desired direction of rotation.

The continued rotation of the runner 32 imparts some heat to the sealing liquid, causing partial vaporization thereof. The amount of vapor thus generated is somewhat restricted by the labyrinth packings 19 which impede its escape and reduce its pressure. The vapor which is finally liberated, however, enters the annular passage 22, wherein it commingles with the vapor which has escaped from the turbine casing 10 through the labyrinth packing element 14, and is discharged through the vapor outlet connection 23 to any region of sufficiently low pressure as, for example, a condenser or the suitable stage of an associated low pressure turbine. In this manner, the sealing fluid together with the heat energy which it has absorbed is retained in the power plant system.

I have found that glands constructed as above described operate effectively and reliably without incurring any substantial loss of sealing fluid. Only such liquid need be supplied to the inlet connection 24 as is necessary to compensate for vaporization, the design of the packing device being such that this vapor is retained in the power plant system. While I have described the runner 17 as being provided with spiral as well as helical grooves, it is to be understood that my invention is not confined to this exact construction, as I may provide various forms of incisions in the runner or add protuberances to the runner which are capable of producing the results set forth.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In a packing gland for sealing the rotor shaft of a turbine against fluid leakage, the combination of a housing fixedly secured to the turbine, a runner disposed within the housing in the path of the fluid leakage, means for conveying sealing liquid to the housing, and a spiral-like furrow provided in each of the transverse faces of the runner, each of said furrows being arranged to impel the sealing liquid in a direction counter to the direction of fluid leakage.

2. In a packing gland for sealing the rotor shaft of a turbine against fluid leakage, the combination of a housing, a sealing liquid inlet provided in the housing, a runner provided in the housing, a spiral-like passage provided in each transverse face of the runner, and a helical passage provided in the peripheral face of the runner, the respective helical and spiral passages being arranged with respect to the direction of rotation so as to impel or convey the sealing liquid in a direction opposite to that of fluid leakage.

3. In a packing gland for sealing the rotor shaft of a turbine against fluid leakage, the combination of a housing fixedly secured to the turbine, sealing liquid inlet means provided in the housing, a runner driven by the turbine and disposed in the housing, a spiral groove provided in one of the transverse faces of the runner for impelling the sealing liquid outwardly from the axis of the runner, a spiral groove provided in the opposite transverse face of the runner for impelling the sealing liquid inwardly toward the axis of the runner, a helical groove provided in the peripheral surface of the runner for impelling the sealing liquid in an axial direction, and a labyrinth packing element interposed between the gland housing and the turbine.

4. In a packing gland, a shaft adapted to transmit energy between media of different relative pressures, a housing enclosing said shaft, a runner on said shaft and within said housing, a substantially non-compressible fluid between the runner and the housing, means on the radial surface of said runner adjacent to the low pressure medium for displacing the substantially non-compressible fluid away from said shaft and means on the other radial surface of said runner for displacing the substantially non-compressible fluid toward said shaft.

5. In a packing gland, a shaft adapted to transmit energy between media of different relative pressures, a housing enclosing said shaft, a runner on said shaft and within said housing, a substantially non-compressible fluid between the runner and the housing, means on the radial surface of said runner adjacent to the low pressure medium for displacing the substantially non-compressible fluid away from said shaft, means on the peripheral surface of said runner for displacing said substantially non-compressible fluid toward the medium having the relatively higher pressure, and means on the other radial surface of said runner for displacing the substantially non-compressible fluid toward said shaft.

In testimony whereof, I have hereunto subscribed my name this eighth day of July, 1925.

FRANK R. SIMPSON.